United States Patent [19]
Kobayashi et al.

[11] Patent Number: 5,129,081
[45] Date of Patent: Jul. 7, 1992

[54] SYSTEM FOR PROCESSING DATA USING LOGIC LANGUAGE

[75] Inventors: Kenzo Kobayashi; Michio Sasaki, both of Kamakura, Japan

[73] Assignee: Mitsubishi Denki K.K., Tokyo, Japan

[21] Appl. No.: 579,249

[22] Filed: Sep. 6, 1990

Related U.S. Application Data

[63] Continuation of Ser. No. 199,678, May 27, 1988, abandoned.

[30] Foreign Application Priority Data

Jun. 3, 1987 [JP] Japan .................. 62-139338
Jul. 23, 1987 [JP] Japan .................. 62-184074

[51] Int. Cl.$^5$ .................................. G06F 9/45
[52] U.S. Cl. ............................ 395/600; 395/54; 364/282.1; 364/275
[58] Field of Search ............. 364/513, 200 MS File, 364/900 MS File; 395/600, 650, 375, 53, 54

[56] References Cited

U.S. PATENT DOCUMENTS

| | | | |
|---|---|---|---|
| 4,648,044 | 3/1987 | Hardy et al. | 364/900 |
| 4,774,661 | 9/1988 | Kumpati | 364/900 |
| 4,775,934 | 10/1988 | Houri et al. | 364/300 |
| 4,787,035 | 11/1988 | Bourne | 364/300 |
| 4,864,497 | 9/1989 | Lowry et al. | 364/200 |
| 4,868,763 | 9/1989 | Masui et al. | 364/200 |

FOREIGN PATENT DOCUMENTS

87/01221 2/1987 PCT Int'l Appl.

OTHER PUBLICATIONS

J. Beer & W. K. Giloi "POPE—a Parallel Operating Prolog Engine" FGCS—Future Generations Computer Systems, vol. 3, No. 2, May 1987.
M. G. Cutcher et al. "Paramedical: a Computer-Aided Medical Diagnosis System . . . ", ICL Technical Journal, vol. 5, No. 3, May 1987.

Primary Examiner—Michael R. Fleming
Assistant Examiner—Debra A. Chun
Attorney, Agent, or Firm—Kanesaka & Takeuchi

[57] ABSTRACT

A logical type language data processing method which includes making a plurality of different application programs each using a predicate type fact database and/or a predicate type rule database; inputting a predicate type question with respect to the application programs to process data by unification and back tracking processes; making and storing a common predicate type fact database which is used commonly by the different application programs; putting a symbol to predicates of the different application programs to indicate that the predicates with the symbol are common type predicates which should use the common predicate type fact database; and accessing the common predicate type fact database if any of the predicates with the symbols is read out during execution of the application programs.

8 Claims, 6 Drawing Sheets

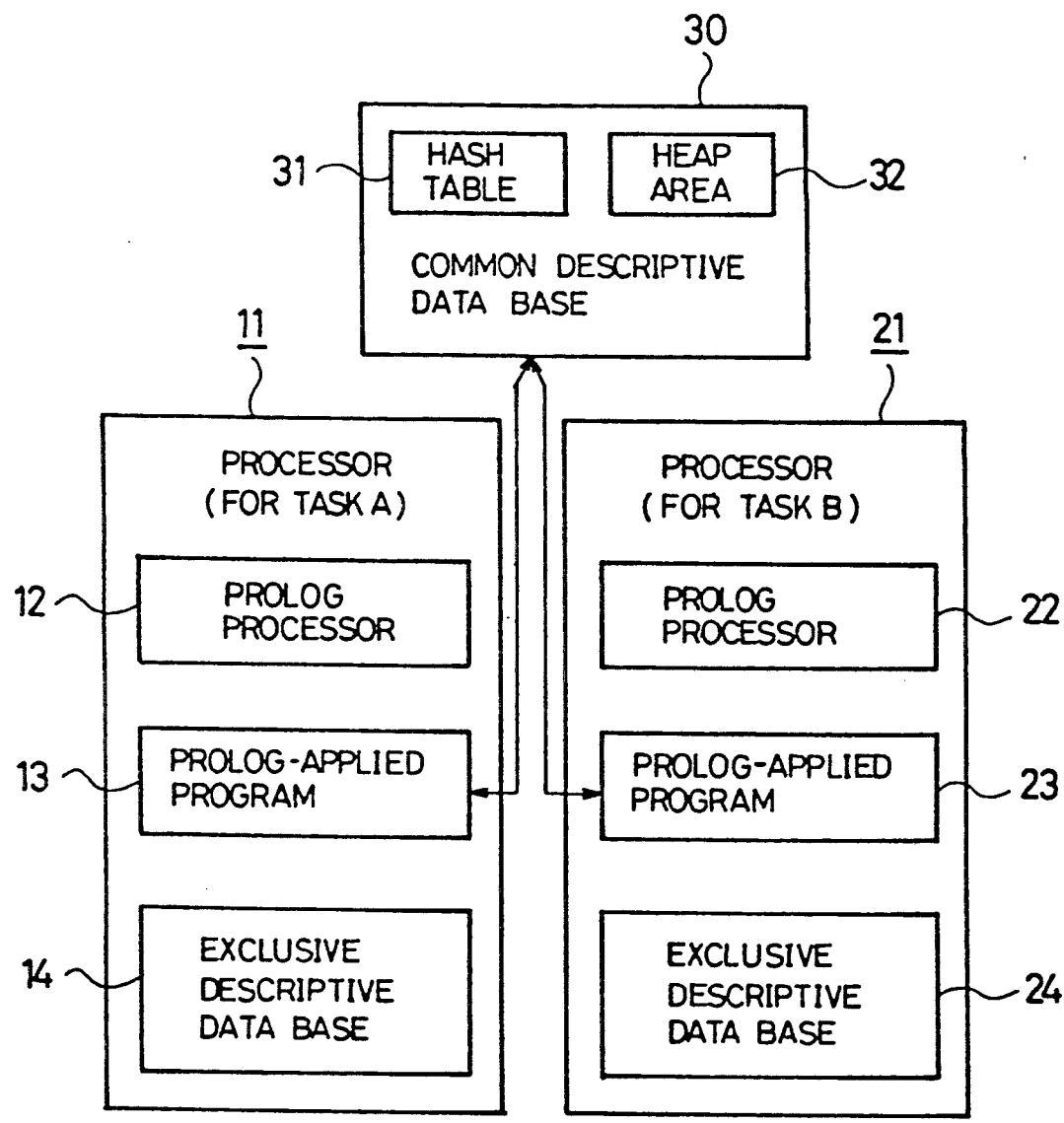

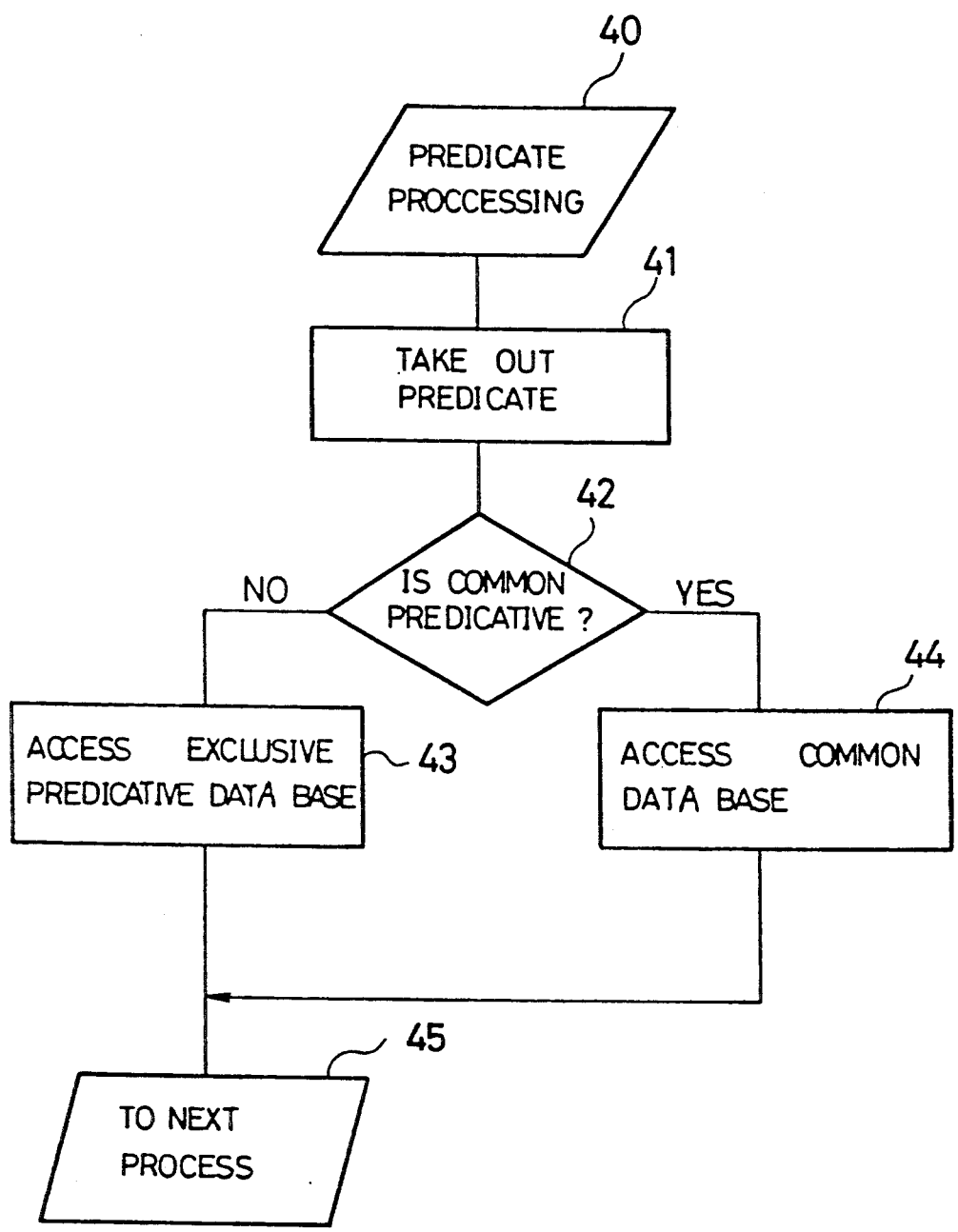

F I G. 3B
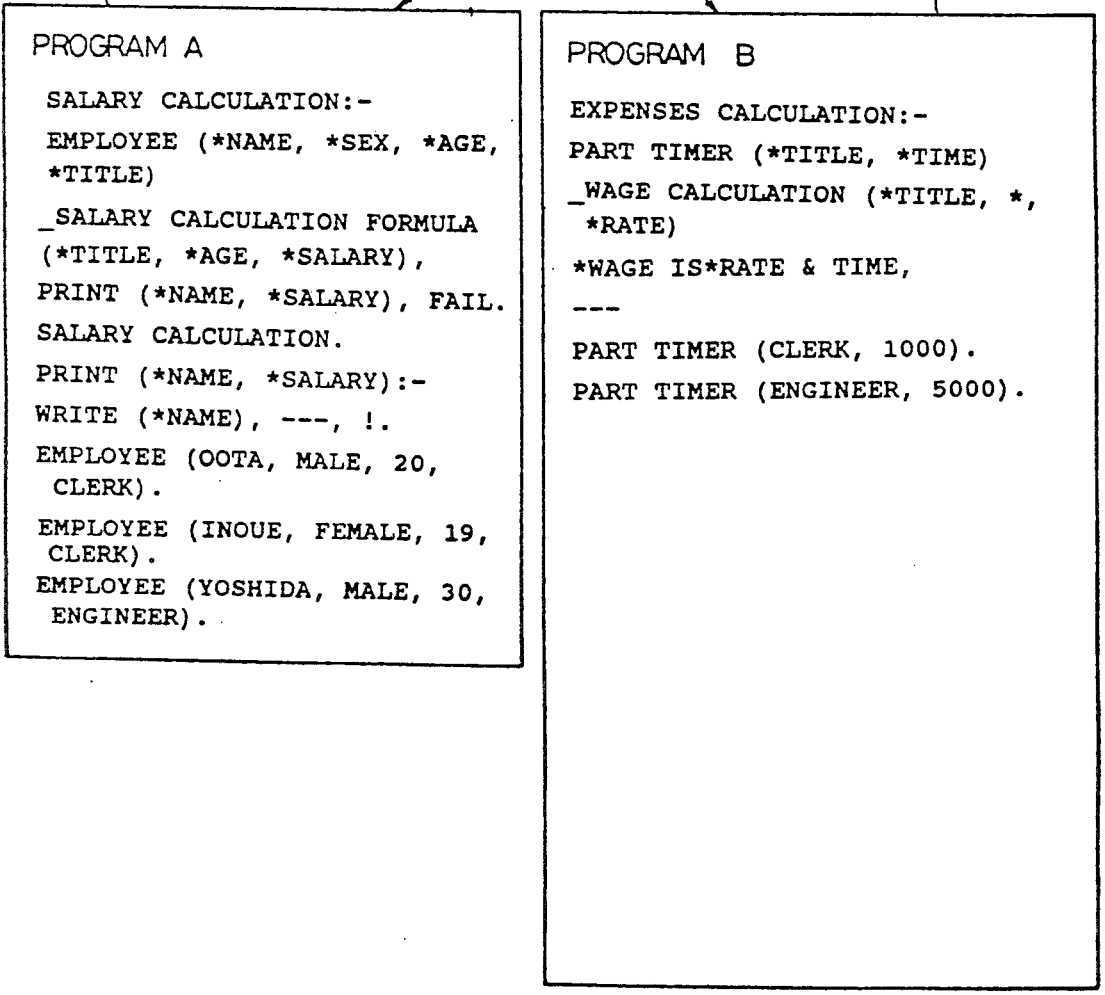

FIG. 5

| | |
|---|---|
| COLOR (APPLE, RED) | F1 |
| COLOR (STRAWBERRY, RED) | F2 |
| COLOR (TANGERINE, YELLOW) | F3 |
| COLOR (TOMATO, RED) | F4 |
| COLOR (CARROT, RED) | F5 |
| COLOR (CORN, YELLOW) | F6 |
| SPECIFIC FORM (APPLE, FRUIT) | F7 |
| SPECIFIC FORM (STRAWBERRY, FRUIT) | F8 |
| SPECIFIC FORM (TANGERINE, FRUIT) | F9 |
| SPECFIC FORM (TOMATO, VEGETABLE) | F10 |
| SPECIFIC FORM (CARROT, VEGETABLE) | F11 |
| SPECIFIC FORM (CORN, VEGETABLE) | F12 |
| LIKE (TARO, X):—— COLOR,( X, RED) | R1 |
| LIKE (HANAKO, X):—— SPECIFIC FORM (X, FRUIT) | R2 |

SYSTEM FOR PROCESSING DATA USING LOGIC LANGUAGE

CROSS-REFERENCE TO RELATED APPLICATIONS

This is a continuation of application Ser. No. 199,678 filed May 27, 1988.

BACKGROUND OF THE INVENTION

1. Field of the Invention

The present invention relates to data processing systems using logical type languages and, more particularly, to a data processing system for prologs or programs in logic.

2. Description of the Prior Art

FIG. 4 shows a conventional data processing system. The processing system 1 includes a prolog processing system 2; a prolog application program 3; and a predicate type database 4 which is incorporated in the prolog application program 3.

FIG. 5 illustrates an example of the prolog application program 3. Reference characters F1-F12 represent examples of the predicate type fact database 4. For example, F1 represents that the name of a predicate is color and the fact that the color of apples is red. R1 and R2 are examples of the predicate type rule database 4. For example, R1 represents a rule "Taro likes X" meaning that Taro likes a color of red when X is a color of red.

It is well known that a variable K of such a prolog application program can be determined by inputting a question "?- like (Hanako, K)" meaning what does Hanako like?This method can be carried out by reading the application program 3 in the order of arrangement using unification of the leading portion of a variable and back tracking until the last successful location in the case of a failure. The prolog processing system 2 has a RUM/prolog and other incorporating predicates and controls execution of the prolog application program 3.

In the above conventional method, the predicate type database 4 is incorporated in the prolog application program 3, which is integrated with the prolog processing system 2 so that it is difficult to make a large program. Where a large program can be divided into a number of blocks, it is easy to make and test such a large program by dividing it into a number of modules. However, it has been impossible by the conventional method.

SUMMARY OF THE INVENTION

Accordingly, it is an object of the invention to provide a data processing system with which it is easy to make a large program by dividing it into a number of modules.

According to the invention there is provided a data processing system in which different prolog processing systems are able to access a common predicate type database.

According to an embodiment of the invention, a symbol, such as an underline "-" is placed in front of the names of predicates in prolog application programs that should use the common predicate type database. Whenever such a predicate is read out, the common predicate type database is accessed.

The above and other objects, features, and advantages of the invention will be more apparent from the following description when taken in conjunction with the accompanying drawings.

BRIEF DESCRIPTION OF THE DRAWINGS

FIG. 1 is a block diagram of a data processing system according to an embodiment of the invention;

FIG. 2 is a flowchart useful for explaining the operations of the prolog processing systems of FIG. 1;

FIG. 3B illustrates examples of the prolog application programs and the common predicate type rule database of FIG. 1;

FIG. 5 illustrates an example of the prolog application program of FIG. 4.

DESCRIPTION OF THE PREFERRED EMBODIMENTS

Figure 3A:
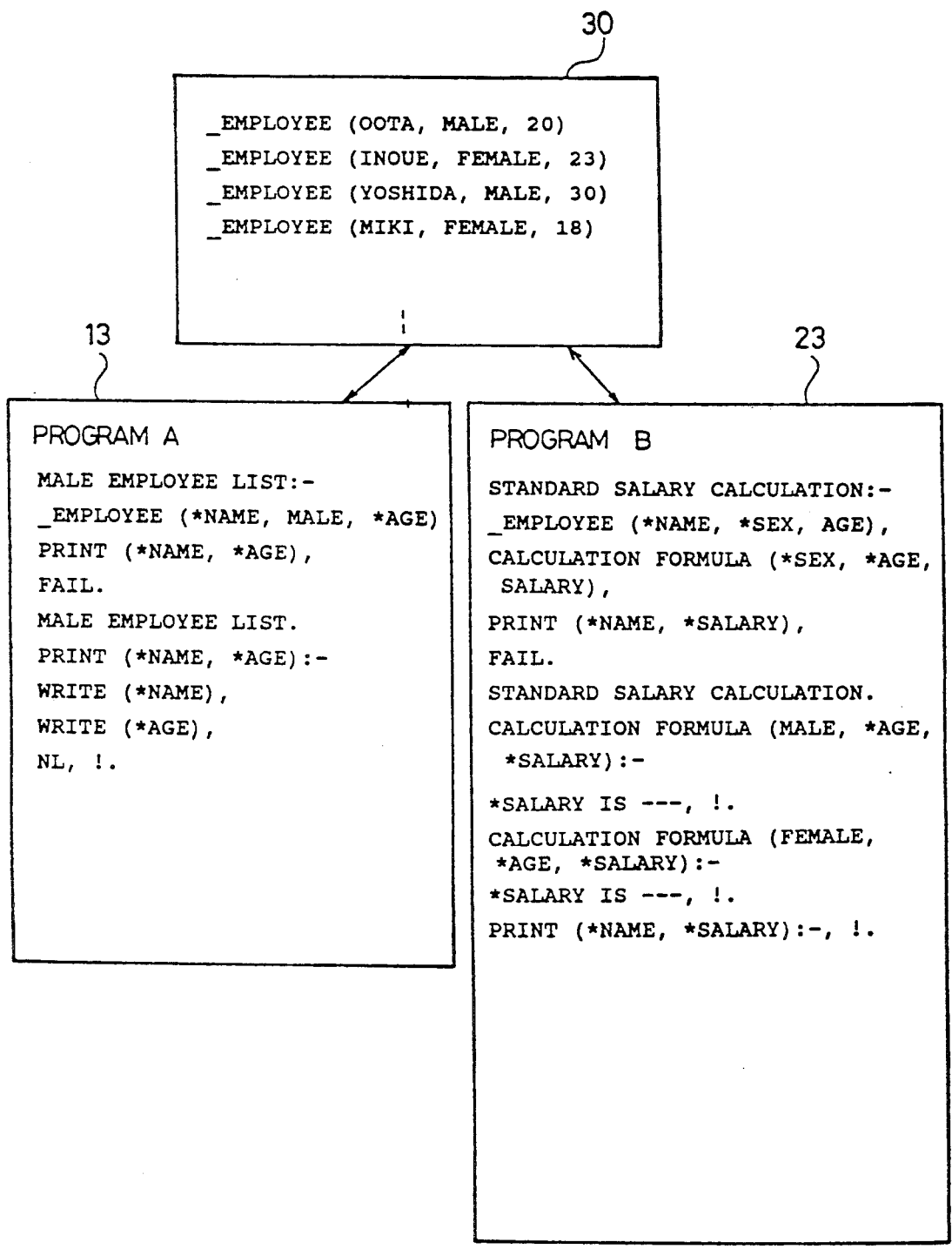
FIG. 3A illustrates examples of the prolog application programs and the common predicate type fact database of FIG. 1.
Figure 4:
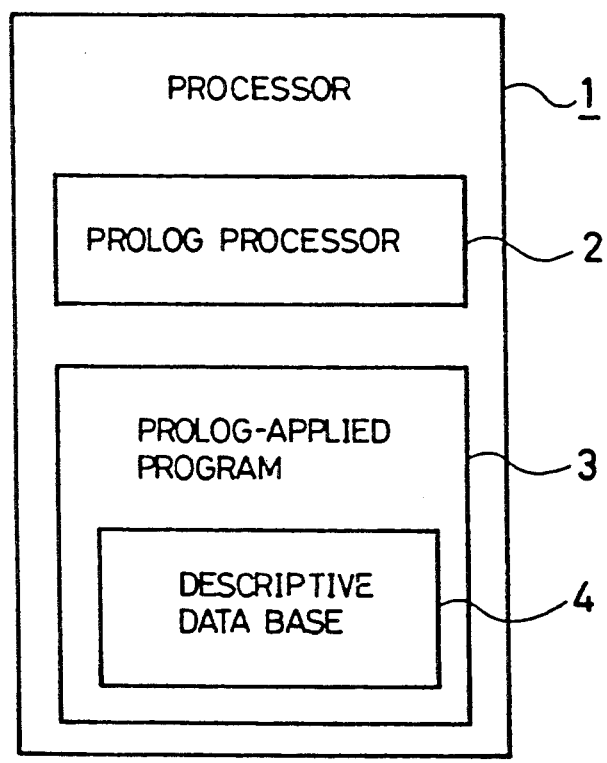
FIG. 4 is a block diagram of a conventional data processing system.

In FIG. 1, the data processing system includes a pair of processors 11 and 21 for tasks A and B, respectively, which each have a prolog processing system 12 (22), a prolog application program 13 (23), and an exclusive predicate type database 14 (24) exclusively used by the processor 11 (21), and a common predicate type database 30 commonly used by the processors 11 and 21.

The common predicate type database 30 include a predicate type fact database and/or a predicate type rule database which contains general rules, regulations, and basic laws but variables. It is put in a permanent segment and has a hash table 31 and a heap area 32 so that the application program 13 (23) is able to access it by copying information in the resident hash table 31 into the prolog processing system 12 (22). In the heap area 32, a pointer is updated and stored.

The two processors 11 and 21 are the same in terms of hardware but are separated because the tasks to be processed are different, and the predicate type common database 30 is loaded in the permanent segment of these processors. Consequently, the prolog processing systems 12 and 22 are provided with information how to access the common database 30, but this is not directly related to the subject matter of this application and, therefore, its description will be omitted. The predicates of the programs 13 and 23 that should access the common database 30 are distinguished by putting a special symbol, such as an underline "_", in front of the predicate name.

The operation of the prolog processing system will now be described with reference to FIG. 2. In the prolog program, a predicate access request takes place at the time of unification by pattern matching in Step 40. The type of a predicate read out in Step 41 is determined in Step 42; i.e., whether or not the predicate has an underline symbol "_" is determined. If the result is No, the exclusive database 14 (24) is used. The subsequent operation in this case is the same as the conventional one. If the result is Yes on the other hand, the control advances to the Step 44 to access the common database 30 (unification) by storing in a predetermined memory space the pointer indicating the rule, for example, of the common database 30 ("sticking" of the pointer). These rules are arranged to make the hash table 31, while the pointers are stored in the heap area 32 by the garbage collector system.

In FIG. 3A, like reference characters denote like or corresponding parts of FIG. 1. The common predicate type fact database 30 which contains the full names (only the family names are shown for purposes of simplicity), sexes, and ages of employees is commonly used for making a list of male employees (Program A) and standard salaries of all the employees (Program B).

In FIG. 3B, the salaries and expenses are calculated according to the invention. The program A is one of the programs that use the common predicate type rule database C. Similarly, the program B uses the common predicate type rule database C. The programs A and B, which seek individual facts, are able to access the common predicate type rule database C containing more basic, general rules by the same method as accessing their own predicate type database.

In this way, it is possible to use the common predicate type rule database C as a subroutine. This enables one to write in a prolog language programs of the same type as written in Fortran making use of the high productivity, reliability, and readability of prolog programs.

Alternatively, the numbers of common databases and programs, which are one and two in the embodiment of FIG. 1, may be more than one and two, respectively.

As has been described above, according to the invention, there is provided a common predicate type database which different prolog processing systems are able to access by the ordinary prolog language method so that it is easy to make a large application program while maintaining the advantages of a prolog language.

What is claimed is:

1. A data management system for a data processing system, comprising:

a main memory;

a plurality of processors each including a prolog processor, a prolog-applied program, and an exclusive descriptive data base containing a descriptive fact data base and/or a descriptive rule data base, said prolog processor being designed to execute prolog-applied programs by sequentially processing fact and descriptive rule data bases;

a common descriptive data base to be commonly accessed by said prolog-applied programs;

programming means for enabling one to write prolog-applied programs to add symbols to facts and predicates of said prolog-applied programs which require access to said common descriptive data base;

check means provided in said prolog processor and operative during said execution for checking each fact or predicate of said prolog-applied program under said execution to determined if said each fact or predicate has said symbol or not; and control means provided in said prolog processor and operative during said execution for causing said prolog-applied program to access either said exclusive descriptive data base when said each fact or predicate is not found to have said symbol by said check means or said common descriptive data base when said each fact or predicate is found to have said symbol, whereby said common descriptive data base is commonly accessed by said prolog processors.

2. The data management system of claim 1, wherein said common descriptive data base comprises a hash table containing data which said prolog-applied programs copy in said main memory to commonly access said common descriptive data base.

3. The data management system of claim 1, wherein said symbol is provided in the form of a underline "_".

4. The data management system of claim 1, wherein said common descriptive data base comprises a heap area and a pointer stored in said heap area by a garbage collection system.

5. A data processing system comprising:

a plurality of processors each assigned for a given task, said processors each including:

(i) a prolog processing system, (ii) a prolog application program, and (iii) an exclusive predicate type database containing a predicate type fact and/or rule database;

a common predicate type database having a predicate type fact and/or rule database and being commonly accessed by prolog application programs;

said prolog processing systems each being designed to execute said prolong application program by accessing said exclusive and/or common predicate type database to sequentially process facts and predicates;

programming means for enabling one to write prolog application programs and put symbols on facts and predicates of said prolog application programs which require access to said common predicate type database;

check means provided in said prolog processing systems and operative during said execution for checking each fact or predicate of said prolog application program under said execution to determine whether or not said each fact or predicate has said symbol; and control means provided in said prolog processing systems and operative during said execution for causing said prolog application program to access either said exclusive predicate type database when said each fact or predicate is not found to have said symbol by said check means or said common predicate type database when said each fact or predicate type found to have said symbol, whereby said common predicate type database is commonly accessed by said prolog application programs.

6. The database management system of claim 5, wherein said common descriptive database comprises a hash table containing data which said prolog application programs are able to copy in said main memory to commonly access said common predicate type database.

7. The database management system of claim 5, wherein said symbol is provided in the form of a underline "_".

8. The database management system of claim 5, wherein said common predicate type database comprises a heap area and a pointer stored in said heap area by a garbage collector system.

* * * * *